Feb. 12, 1952 R. W. JONES 2,585,130
LOCAL AND TRUNK CALL DISCRIMINATING SYSTEM
Filed Jan. 9, 1948 5 Sheets-Sheet 1
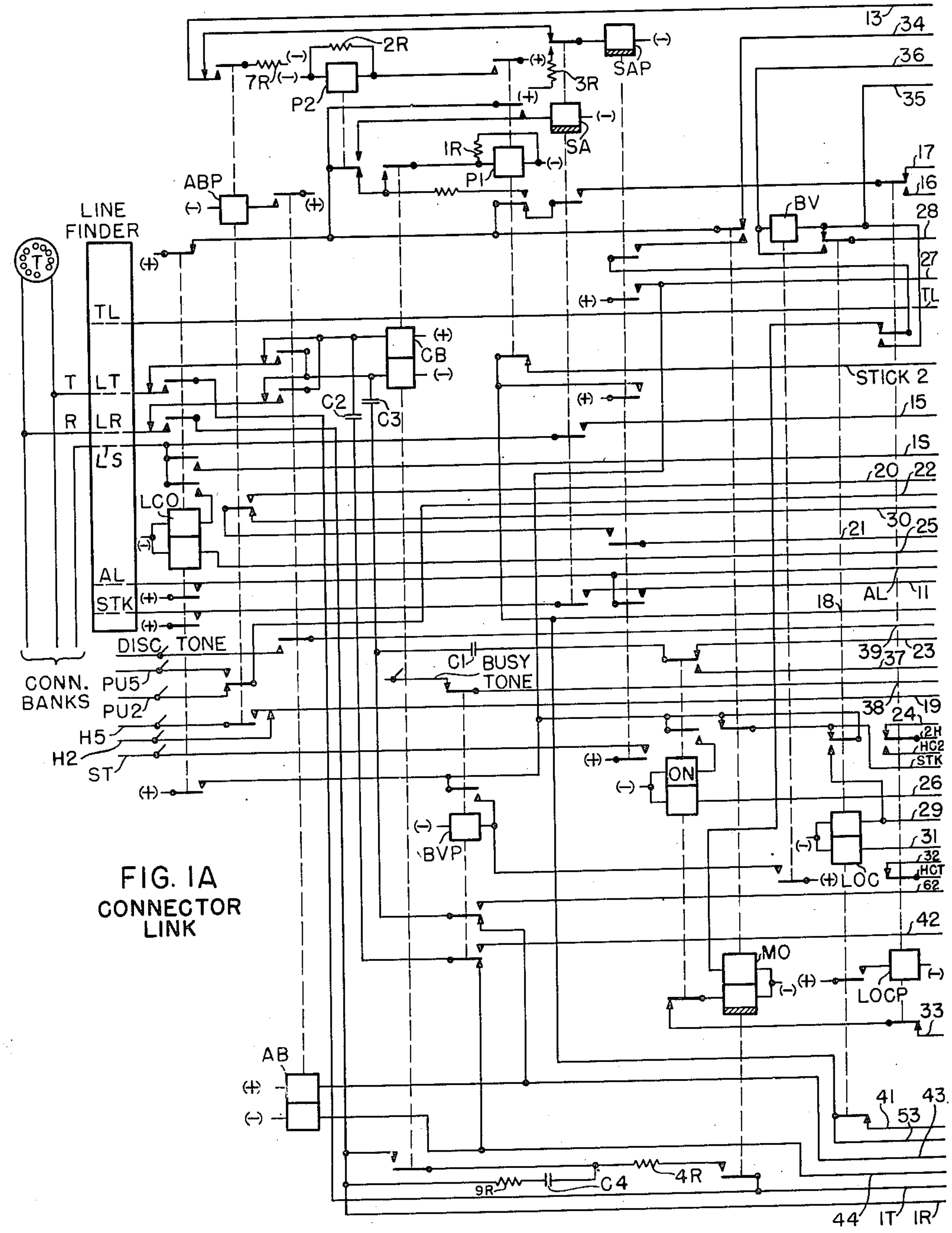
FIG. 1A CONNECTOR LINK
INVENTOR.
ROY W. JONES
BY
*Winfred T. Powell*
ATTORNEY

LOCAL AND TRUNK CALL DISCRIMINATING SYSTEM

Filed Jan. 9, 1948 5 Sheets-Sheet 2

CONNECTOR LINK

INVENTOR.
ROY W. JONES

BY

Winfred T. Powell
ATTORNEY

Feb. 12, 1952 R. W. JONES 2,585,130

LOCAL AND TRUNK CALL DISCRIMINATING SYSTEM

Filed Jan. 9, 1948 5 Sheets-Sheet 3

CONNECTOR
LINK

INVENTOR.
ROY W. JONES

BY

Winifred T. Powell
ATTORNEY

LOCAL AND TRUNK CALL DISCRIMINATING SYSTEM

LINE & TRUNK
CONNECTOR

*INVENTOR.*
ROY W. JONES

*BY*
Winfred T. Powell
ATTORNEY

LOCAL AND TRUNK CALL DISCRIMINATING SYSTEM

Filed Jan. 9, 1948

5 Sheets-Sheet 5

*INVENTOR.*
ROY W. JONES
*BY* Winfred T. Powell
ATTORNEY

Patented Feb. 12, 1952 2,585,130

UNITED STATES PATENT OFFICE 2,585,130

LOCAL AND TRUNK CALL DISCRIMINATING SYSTEM

Roy W. Jones, Rochester, N. Y., assignor to Stromberg-Carlson Company, a corporation of New York Application January 9, 1948, Serial No. 1,295

11 Claims. (Cl. 179—18)

Figure 1B:
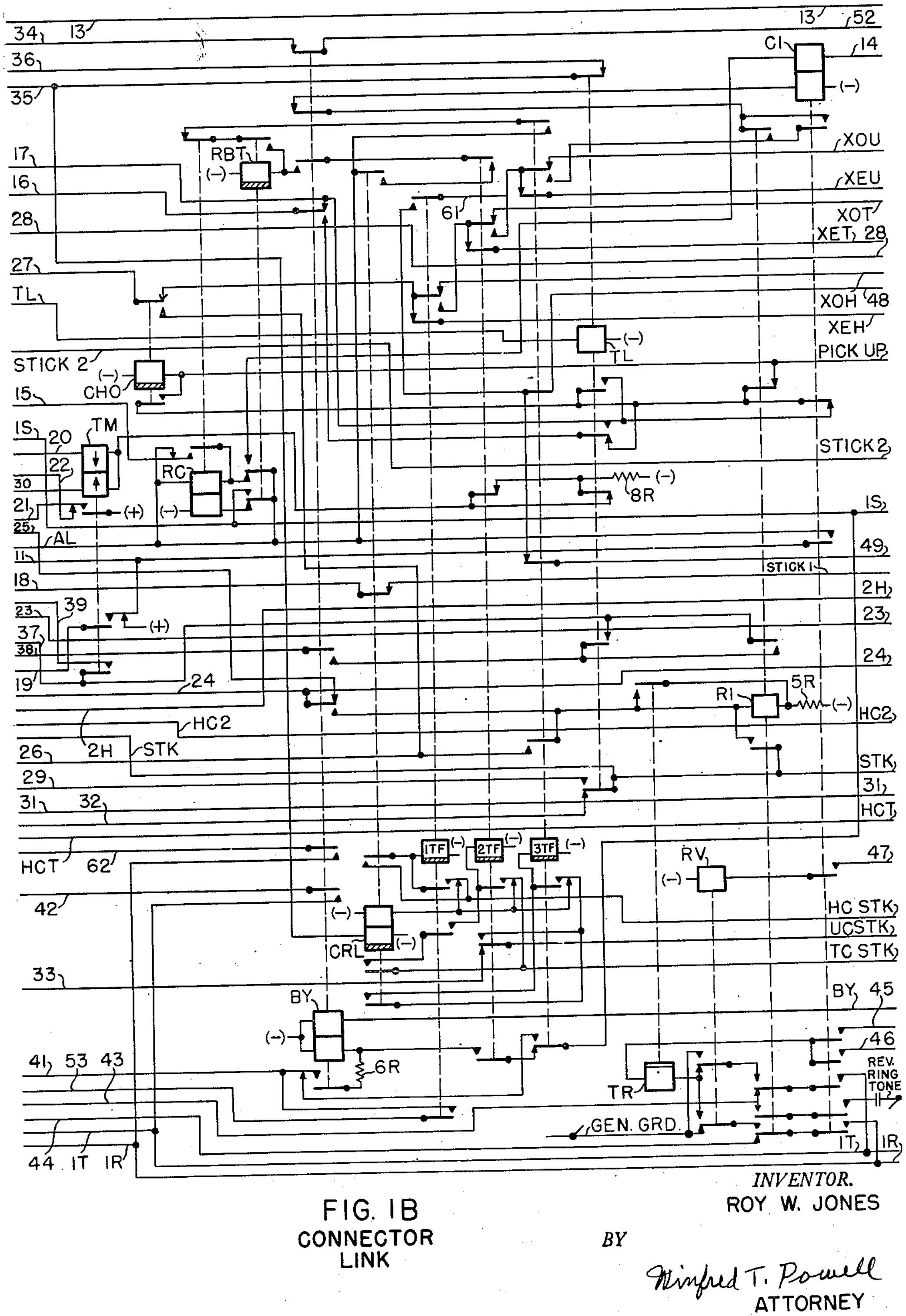
Figure 2:
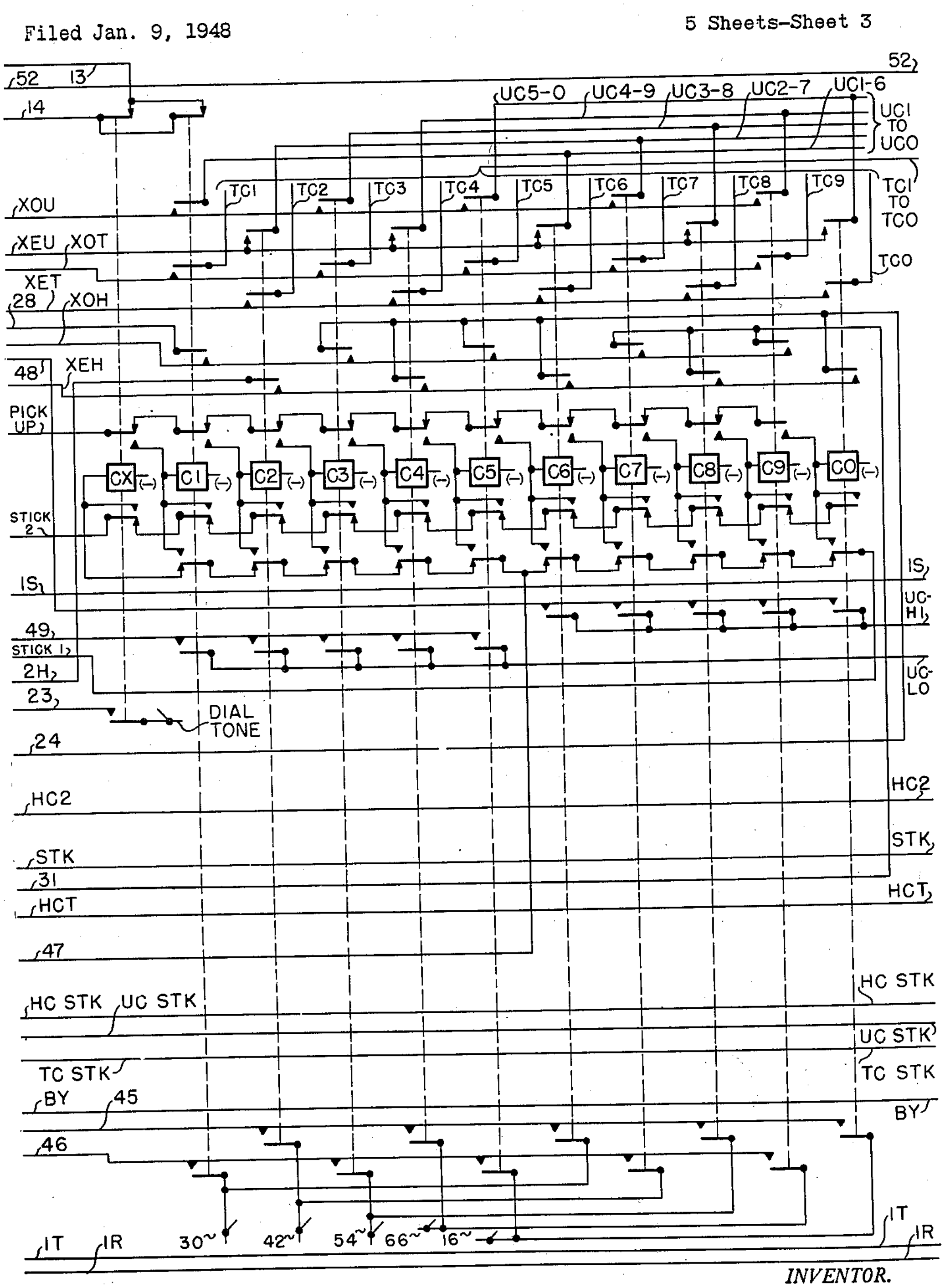
Figure 3:
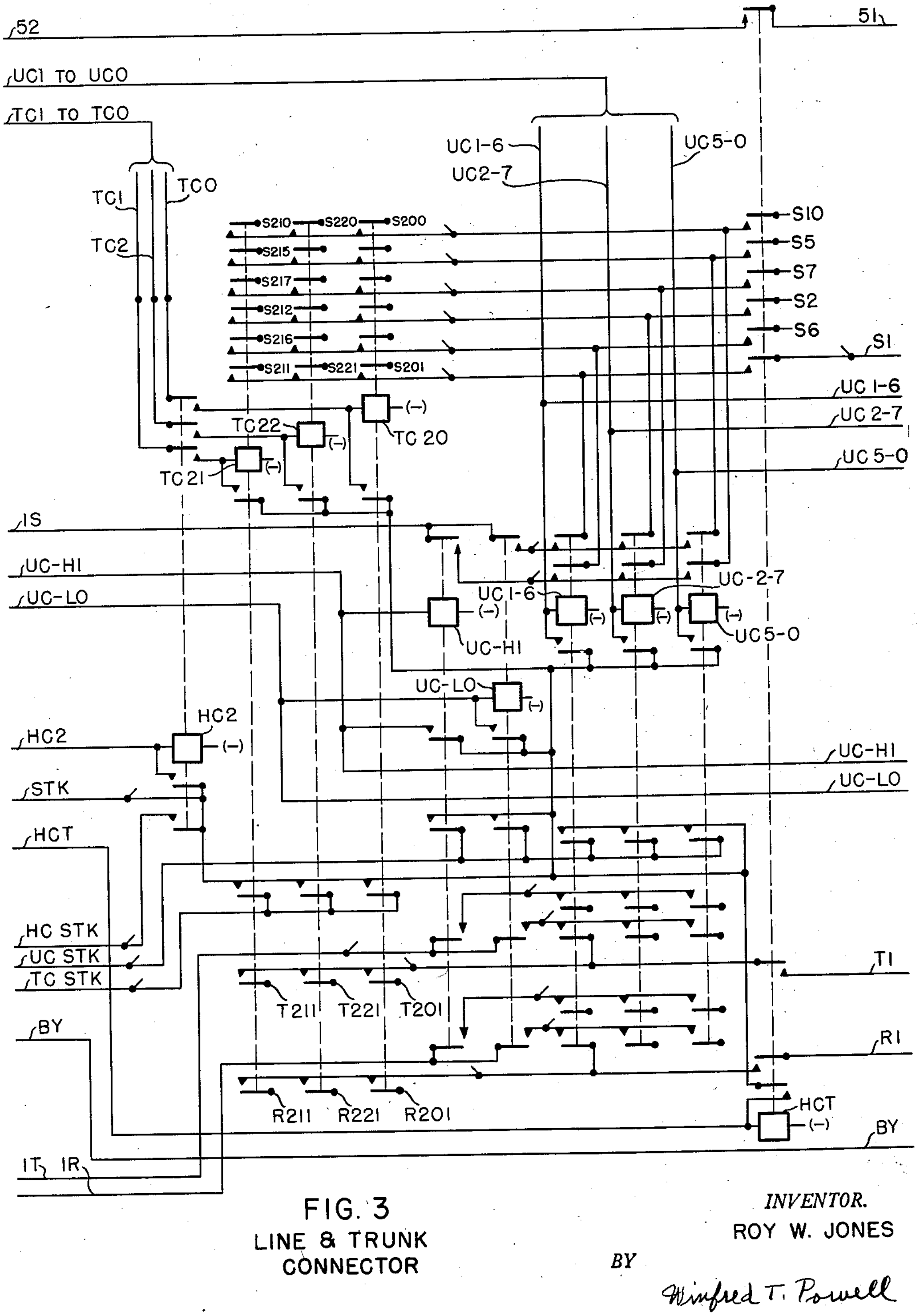

This invention relates to switching systems and it more particularly pertains to multi-office automatic telephone systems in which calls are completed through the medium of automatic switching devices and in which certain calls are completed by way of interoffice trunks to a distant main office, while certain other calls initially use these interoffice trunks to the main office but disconnect therefrom for completing calls in the local automatic suboffice.

The economic reasons for employing satellite or subexchanges are well known and need not be discussed here. Subexchanges or suboffices usually have installed only originating and terminating apparatus such as line circuits, line finders and connectors, while the switches of the intermediate switching stages are located in the main office.

In automatic telephone systems of this type, all calls originating in the suboffice are trunked to the main office where further selections are made. This is the case for both local and outgoing calls, consequently trunking facilities will be tied up for local connections unless special provision is made to prevent this tie-up. A number of ways of releasing the trunking apparatus on local calls have been devised in selector type systems. This particular disclosure relates to a combination connector and switching connector of the all-relay type operating in an all-relay type automatic telephone system.

The main function of the connector is to register one or more digits of the called number as rejuired to identify the call as local or outgoing and to perform the necessary switching operations to release the apparatus not absolutely required in the final connection.

The main object of the present invention is to improve systems of the above general character by the provision of new and improved circuits preferably of the all-relay type for performing the necessary switching operations efficiently and economically.

One feature of the present invention relates to the provision of connector-switching-repeaters in the suboffice for selecting trunks to the main office, with these connector-switching-repeaters being arranged to drop back in response to the dialing of certain first digits and to hold in response to the dialing of certain other digits, thus providing for a universal numbering system in the network.

Other objects, purposes and characteristic features of the present invention will be in part obvious from the accompanying drawings and in part pointed out as the description progresses.

In describing the invention in detail, reference will be made to the accompanying drawings in which like reference characters designate corresponding parts and in which Figs. 1A, 1B, 2, 3, and 4, when arranged in the order named and with correspondingly identified lines in alignment, disclose circuits embodying the various features provided by the present invention.

For the purpose of simplifying the drawings and facilitating the explanation, the various parts and circuits constituting the embodiment of the invention have been shown diagramatically and certain conventional illustrations have been employed, the drawings having been made more with the purpose of making it easy to understand the principles and mode of operation than with the idea of illustrating the specific construction and arrangement of parts that would be employed in practice. For example, the various relays and their contacts are illustrated in a conventional manner, with all of the contacts associated with a particular relay being indicated as controlled by this relay by means of a dashed line associating the relay coil with its contacts.

Reference characters have been applied to the relays and to certain conductors which suggest particular circuit functions, the functions of the various relays being pointed out as the description progresses. The usual exchange battery for operating an automatic telephone system is not illustrated in the drawings. To illustrate the connections of the various relays and circuits to the central office battery, the (—) symbol is used to indicate a connection to the negative side of the common battery, while the (+) symbol is used to illustrate a connection to the positive side of this same common battery. Certain common alarm and time release relays and circuits usually provided in systems of this type have been omitted from the present disclosure, since these common elements may be connected to the indicated leads in any approved manner to provide the required circuit operation.

It is believed that the invention will be best understood by explaning the operation of the various circuits when a call is originated from a particular calling line, for example that telephone line illustrated in the upper left hand portion of Fig. 1A having the reference character T. Different classes of calls will be explained in detail, such as a call originated at telephone T and to be terminated in the distant main office, a call originated at telephone T and to be terminated in this same suboffice, a toll incoming call and a reverting call.

In order to operate a system of this type and provide a universal numbering arrangement, it is customary to select an interoffice trunk when the originating station initiates a call and to repeat impulses over this trunk from the calling station until the registration of the particular series of impulses indicates whether the call is to terminate in this local suboffice or is to be completed over the interoffice trunk. In this connection, it will be assumed that the calling party, illustrated as sub-station T, removes the receiver and dials 72111 for selecting a particular station on a line terminating in this suboffice, in other words making a local call. After this type of connection is described, it will then be assumed that the same calling party removes the receiver and dials 2 for the first digit, marking this call as one to be completed by way of the distant main office.

When the receiver is removed at the calling station T, the line circuit in the suboffice functions to cause this line to be connected to the connector link illustrated in Figs. 1A, 1B, 2 and 3. Since the particular line circuit and line connecting arrangement is immaterial for an understanding of the present invention, the connection of the calling line to the connector link is illustrated as being by way of the line finder illustrated by the rectangle in the left hand portion of Fig. 1A. This line finder may be of any conventional type such, for example as that illustrated in Fig. 4 of Powell application, Serial No. 770,119, filed August 22, 1947, now Patent No. 2,562,123, granted July 24, 1951, and assigned to the same assignee as the present invention.

When the calling line is extended to the connector link a circuit is closed for operating calling bridge relay CB extending from (+), upper winding of relay CB, break contact of answering bridge relay AB, break contact of link cutoff relay LCO, line finder tip conductor LT, tip conductor or lead T of the calling line, sub-station circuit, ring conductor or lead R, conductor LR, break contact of relay LCO, break contact of relay AB and lower winding of relay CB to (—). A circuit is now closed for operating pulse correcting relay P1 extending from (+), break contact of relay LCO, break contact of pulse correcting relay P2, make contact of relay CB and winding of relay P1 to (—). A circuit is now closed for operating relay P2 extending from (+), make contact of relay P1 and winding of relay P2 to (—). Relays P1 and P2 are shunted by non-inductive resistances 1R and 2R, respectively, to provide the proper timing of these two relays in connection with the impulses received from the calling dial. Slow acting relay SA is also operated at this time over a circuit extending from (+), break contact of relay LCO, make contact of relay P2 and winding of relay SA to (—). The operation of relay SA closes a circuit for operating its repeater relay SAP extending from (+), resistor 3R, make contact of relay SA and winding of relay SAP to (—). A circuit is closed at this time for operating relay CX of the counting relay group of Fig. 2 extending from (+), make contact of relay SAP, conductor 18, break contact of relay CRL, stick 1 conductor, break contacts in series of relays CO to C1 inclusive and winding of relay CX to (—). Dial tone is now connected to the calling station as an indication that the circuits are in condition to receive dial impulses. This circuit may be traced from the source of dial tone, through make contact of relay CX, conductor 23, break contact of off-normal relay ON, condenser C1, condenser C3 and over the above traced circuit to the calling line.

The operation of relay SAP closes a circuit for operating the trunk connecting relay HCT extending from (+), make contact of relay SAP, break contacts of relays LOC and MO in multiple, stick conductor STK, break contact of toll line relay TL, conductor 32, break contact of relay LOCP, conductor HCT and winding of relay HCT to (—). Relay HCT closes a locking circuit for itself extending from (+) on conductor STK, make contact and winding of relay HCT to (—). Reverting call relay RC is also operated at this time over a circuit extending from (+), break contact of timer relay TM, conductor 11, make contact of relay SAP, allotter conductor AL, break contact of reverting busy test relay RBT and lower winding of relay RC to (—). Incidentally, this circuit from (+) on conductor AL functions to make this connector link busy in the link allotter circuit (not shown) as indicated by this AL conductor being extended into the finder by means of a dotted line.

The operation of the HCT relay closes a circuit for operating lockout relay LO1 associated with this particular connector link in the trunk marker, this circuit extending from (+), break contact of relay LCO, break contact of main office marking relay MO, conductor 34, break contact of busy relay BY, conductor 52, make contact of relay HCT, conductor 51, winding of relay LO1, break contact of relay LO1 and break contact of common lockout relay CLO to (—). The operation of relay LO1 closes a locking circuit for itself including the winding of relay CLO. This locking circuit operates relay CLO in series with relay LO1 for disconnecting (—) from all other LO relays associated with other connector links to prevent the marking of another calling connector link at this particular time. The operation of relay LO1 closes a circuit for operating the first allotter group relay, associated with the first trunk (assumed to be idle), extending from (+), make contact of relay LO1, break contact of guard relay GD, break contact of allotter relay 1AL and winding of allotter group relay 1ALG to (—). The operation of relay 1ALG (or any other ALG relay of the group) closes an obvious circuit for operating relay GD and this latter relay transfers the above described operating circuit for relay 1ALG to its locking circuit extending through a make contact of relay GD, break contact of relay 1AL, make contact and winding of relay 1ALG to (—).

Since the No. 1 trunk to the main office is marked as that which is to be selected by the connector link, relays UC1-6 and UCLO of this connector link are next operated for making this connection. The circuit for operating relay UC1-6 extends from (+), make contact of relay LO1, make contact of relay 1ALG, conductor UC1-6 and winding of relay UC1-6 to (—). The circuit for operating UCLO may be traced from (+), make contact of relay LO1, make contact of relay 1ALG, conductor UCLO and winding of relay UCLO to (—). Locking circuits for the UC1-6 and the UCLO relays are now closed from (+) on stick conductor STK, make contacts of these UC relays and their windings to (—). A circuit is now closed for operating relay MO extending from (+) on conductor STK, make contacts in multiple of the UC relays, conductor UCSTK, break contact of relay 2TF, conductor 33, break contact of relay LOCP, break contact of relay ON and lower winding of relay MO to (—). A locking circuit is now closed for relay MO extending from (+), break contact of relay LCO, make contact of relay MO, make contact of relay SAP, break contact of relay LOCP and upper winding of relay MO to (—).

Figure 4:
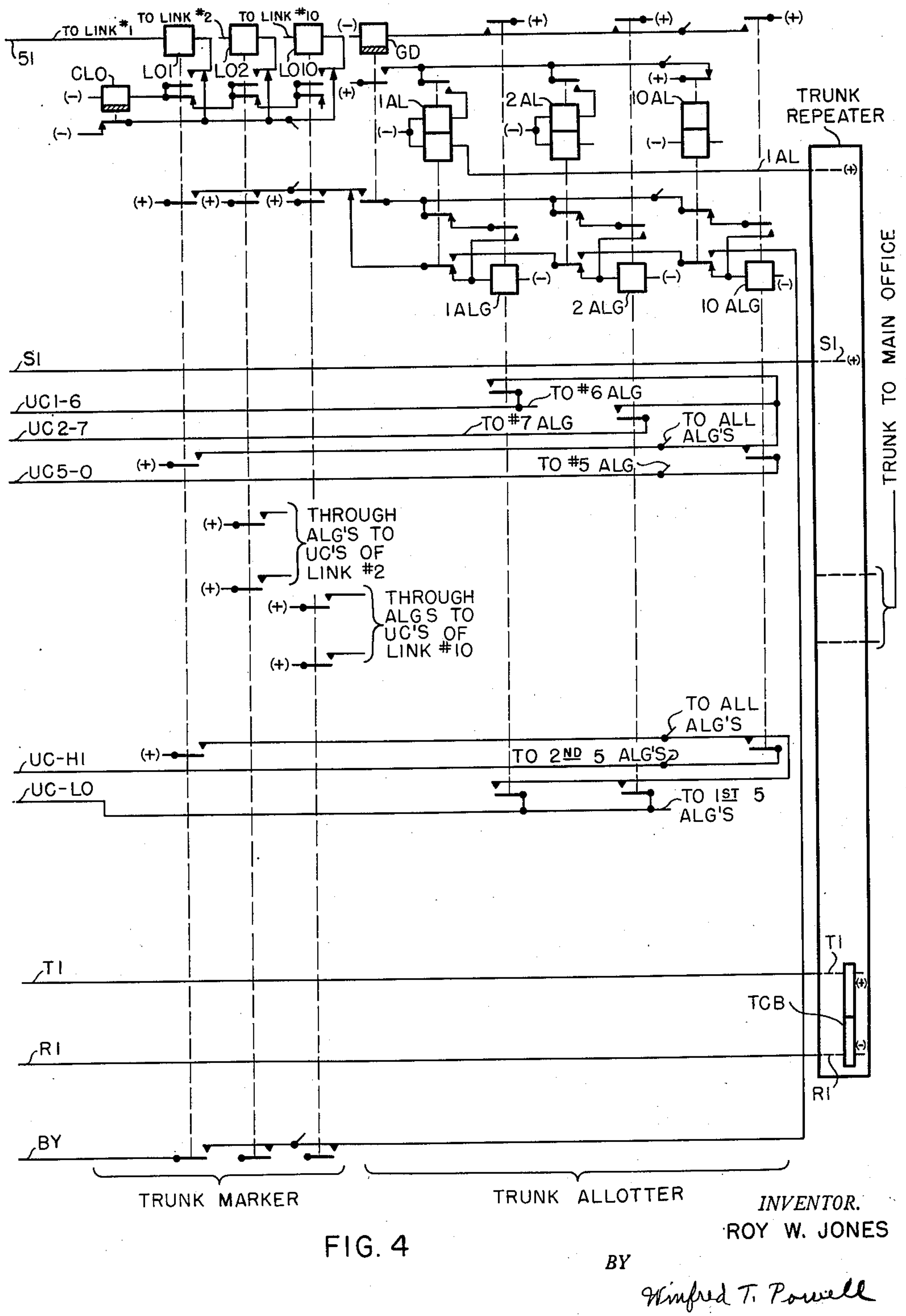

The operation of relays HCT, UC1-6, and UCLO effect the selection of the first trunk extending to the main office. The circuits of Fig. 4 illustrate how other interoffice trunks may be selected if the No. 1 trunk is busy. For example, relay 1AL will be in its operated position (operated as will later be described) when the No. 1 trunk is busy for switching the circuit from relay 1ALG to relay 2ALG if the No. 2 trunk is idle. The operation of relay 2ALG is similar to that explained in connection with 1ALG except that relay 2ALG selects relay UCLO and relay UC2-7 for operating these two relays to select the No. 2 trunk. It will also be obvious that the operation of a relay higher than No. 5 ALG, for example relay 6ALG, will operate relay UCHI, and relay UC1-6, for example, for selecting the No. 6 trunk to the distant office.

The operation of relay MO opens up the above described circuits for relays LO1 and CLO for effecting the release of these two relays. The release of relay CLO again connects (—) to the LO relays so that another LO relay associated with another connector link can be operated in response to the origination of another call. The operation of relay MO closes a circuit for operating the trunk calling bridge relay TCB (Fig. 4) of the trunk repeater which may be traced from (+), upper winding of relay TCB through the trunk repeater circuits (not shown), trunk conductor T1, make contact of relay HCT, make contact of relay UC1-6, make contact of relay UCLO, trunk conductor 1T, make contact of relay MO, resistor 4R, make contact of relay CB, trunk conductor 1R, make contact of relay UCLO, make contact of relay UC1-6, make contact of relay HCT, trunk conductor R1 and through the trunk repeater circuits (not shown) to the lower winding of relay TCB and to (—).

The other relays of the trunk repeater are not shown since this may be a conventional trunk repeater which applies (+) to allotter conductor 1AL and sleeve conductor S1 when it is seized by a trunk call, as indicated by the dotted lines extending from these two conductors to (+). The (+) on conductor 1AL operates the No. 1 allotter relay 1AL by way of its lower winding and this allotter relay is locked operated by way of its upper winding until the last trunk is used for operating the last or No. 10AL relay, which opens up this locking circuit for effecting the release of relay 1AL if this No. 1 trunk has become idle in the meantime. This arrangement provides full rotation of the trunk circuits; that is, calls will be advanced all the way from the first to the last trunk in rotation even though one of the lower numbered trunks should become idle before the last trunk is taken for use. The operation of relay 1AL opens up and releases relay 1ALG and this relay in turn opens up and releases relay GD for allotting the next trunk.

The calling party now operates the dial to transmit 7 impulses in response to the first digit No. 7, above assumed. These impulses effect the intermittent release of relay CB and each time relay CB is released the circuit of relay P1 is opened which effects the release of this latter relay and each time relay CB energizes the circuit is completed for again operating relay P1. Since relay P2 is a direct repeater of relay P1, relay P2 likewise repeats the 7 impulses transmitted from the calling dial. Since the above described circuit for relay SA is interrupted by these repeated impulses at a fairly rapid rate, relay SA is not de-energized because of its slow acting characteristics.

The first release of relay P1 closes a circuit for operating counting relay C1 extending from (+), break contact of relay LCO, break contact of relay P1, make contact of relay SA, break contact of relay LOCP, conductor 17, break contact of cut-in relay CI, break contact of ringing relay RI, pick-up conductor, make contact of relay CX and winding of relay C1 to (—). At the same time the circuit is closed for operating relay C1 and before relay C1 has time to operate, a locking circuit is closed for holding relay CX operated until the end of this first impulse, this circuit extending from (+), make contact of relay SAP, break contact of relay P1, stick 2 conductor, make contact and winding of relay CX to (—). The operation of relay C1 closes a first locking circuit for itself extending from (+), make contact of relay SAP, conductor 18, break contact of relay CRL, stick 1 conductor, break contacts in series of relays C0 to C2 inclusive, make contact and winding of relay C1 to (—). The operation of relay C1 opens up the above described operating circuit for relay CX, but this latter relay is now held by way of the above described stick 2 circuit.

At the same time that the circuit is closed for operating relay C1, a circuit is closed for operating the changeover relay CHO which extends from (+) on the pick-up conductor (Fig. 1B) and the winding of relay CHO to (—). The operation of relay CHO closes, at its lower make contact, a shunt across the break contact of relay RI to maintain the circuit to the CHO relay completed during a series of impulses when the RI relay is operated during this series, such as will be explained in connection with the dialing of the ringing digit. A circuit is now closed for operating relay ON (Fig. 1A) which extends from (+), make contact of relay SAP, conductor 27, make contact of relay CHO, conductor 26, and lower winding of relay ON to (—). Relay ON closes a locking circuit for itself extending from (+), make contact of relay SAP, make contact and upper winding of relay ON to (—). Relay ON opens up the above described circuit of the dial tone connection to the calling line. At the termination of the first impulse, the operation of relay P1 opens up the stick 2 circuit for effecting the release of relay CX.

When relay P1 is released to mark the beginning of the second impulse, a circuit is closed for operating relay C2 extending from (+), break contact of relay LCO, break contact of relay P1, make contact of relay SA, break contact of relay LOCP, conductor 17, break contact of relay CI, break contact of relay RI, pick-up conductor, break contact of relay CX, make contact of relay C1 and winding of relay C2 to (—). At this time the stick 2 circuit for relay C1 is closed to prevent the release of this relay until the end of this second impulse period. This circuit may be traced from (+), make contact of relay SAP, break contact of relay P1, stick 2 conductor, break contact of relay CX, make contact and winding of relay C1 to (—). At the time relay C2 operates, the first locking circuit for relay C1 is opened but this latter relay is now held operated by the stick 2 circuit.

When relay P1 is operated at the end of the second impulse period, the stick 2 circuit is opened for effecting the release of relay C1. It is believed that the above is sufficient to indicate the pickup and locking or stick circuits for the counting relays so that the operating circuits for the remaining counting relays will not be explained, it being understood that when the dial stops to mark the end of the transmission of seven impulses, relay C7 will be in its operated position and all other counting relays will be released. Furthermore, since the impulses applied to the pick-up conductor have now terminated, relay CHO is de-energized for a sufficiently long interval to permit it to release. During the transmission of the first series of impulses to the counting relays, the lower make contact of relay CB repeats these impulses to the trunk repeater TCB relay.

Since the first digit has now been recorded in the connector link, it is now in order to execute or transfer this recorded digit to the relays which indicate whether this is a local or a trunk call. Since it is assumed that these 7 impulses for the first digit indicate a call local to the suboffice, it will now be explained how the local relay LOC is operated. The operating circuit for this relay may be traced from (+), make contact of relay SAP, conductor 27, break contact of relay CHO, break contact of the first transfer relay 1TF, odd executing conductor XOH, make contact of counting relay C7, conductor 31 and lower winding of relay LOC to (—). Relay LOC closes a locking circuit for itself extending from (+) through make contact of relay SAP, make contact and upper winding of relay LOC to (—). Relay LOC closes an obvious operating circuit for its repeating relay LOCP. Since the contacts of relays C7, C8 and C9, connect the executing conductors XOH and XEH to conductor 31, it will be obvious that the dialing of 7, 8 or 9 for the first digit will cause the circuits to function in the above described manner.

Since the first digit, comprising seven impulses has now been transmitted and recorded on the counting relays for operating relays LOC and LOCP as an indication that this is a local call, it is now in order to release the HCT, the UC1-6, and the UCLO relays for clearing out the trunk circuit to the main office. The operation of relay LOCP opens up the above described locking circuit for relay MO, thus effecting the slow release of this latter relay. With relays LOC and MO operated, conductor STK is disconnected from the circuit leading to (+) at a make contact of relay SAP which energized the above described locking circuit for relays HCT, UC1-6 and UCLO, thus releasing these three relays. It will be understood that the impulses repeated by the lower make contact of relay CB to the TCB relay of the trunk are effective to transmit the impulses of the first digit to the automatic equipment in the main office. However, since this is a local call and this main office equipment is not required for the remainder of the connection, it is cleared out by the release of the HCT and UC relays which were operated to select the inter-office trunk.

Counter release relay CRL is operated before the release of relay MO over a circuit extending from (+), break contact of relay LCO, make contact of relay MO, make contact of relay SAP, make contact of relay LOCP, conductor 35 and lower winding of relay CRL to (—). This circuit is opened by the release of relay MO for effecting the release of relay CRL. With relay CRL operated, the stick 1 conductor is opened for releasing the counting relay left operated in response to the previously described digit (relay C7 in the example described) and when relay CRL releases, the stick 1 conductor is again energized for again operating relay CX to prepare the counting relays for the next digit.

Since it was assumed that the second or hundreds digit is the digit 2, relays CB, P1 and P2 will repeat these two impulses for operating relays C1, CHO and C2, after which relay C1 is released, leaving relay C2 operated and then when relay CHO has time to release, the executing circuit is closed for operating the hundreds relay selected by this hundreds digit. In the present example, this executing circuit operates hundreds relay HC2 (Fig. 3) over a circuit extending from (+), make contact of relay SAP, conductor 27, break contact of relay CHO, break contact of relay 1TF, even hundreds executing conductor XEH, make contact of relay C2, the second hundreds conductor 2H, make contact of relay LOCP, conductor HC2 and winding of relay HC2 to (—). Relay HC2 closes a locking circuit for itself from (+) on stick conductor STK, make contact and winding of relay HC2 to (—). The CRL relay is operated when the HCSTK conductor is connected to (+) by the operation of relay HC2, this circuit extending through a break contact of the make before break combination of relay 1TF to the upper winding of relay CRL.

The first transfer relay 1TF, is now operated over a circuit extending from (+) on conductor STK, make contact of relay HC2, conductor HCSTK, make contact of relay CRL (which is operated at this time) and winding of relay 1TF to (—). When relay 1TF operates, as above described, it closes a locking circuit for itself from (+) on conductor HCSTK, make contact of the make before break combination of relay 1TF and winding of this relay to (—). The operation of relay 1TF opens up and de-energizes relay CRL and during the interval while slow-to-release relay CRL remains operated, conductor stick 1 is opened for releasing the counting relay left operated, in this example relay C2. Then when relay CRL is released, relay CX is again operated over its above described operating circuit for preparing the counting relays for receiving the next digit.

When the calling device is operated for the next or tens digit, the single impulse transmitted for this digit effects the release of relays CB, P1 and P2 for operating and locking counting relay C1, relay CX being released at the end of this impulse transmission. Relay CHO is operated and released for operating the selected tens connecting relay, in this example relay TC21. This circuit may be traced from (+), make contact of relay SAP, conductor 27, break contact of relay CHO, make contact of relay 1TF, break contact of relay 2TF, odd tens executing conductor XOT, make contact of relay C1, conductor TC1, make contact of relay HC2 and winding of relay TC21 to (—), relay TC21 closing a locking circuit for itself extending from (+) on conductor STK, make contact and winding of relay TC21 to (—). (+) on conductor STK is extended back over conductor TCSTK, break contact of relay 2TF and upper winding of relay CRL to (—) for operating relay CRL, the operation of relay CRL closing a circuit for operating the second transfer relay 2TF extending from (+) on conductor TCSTK, make contact of relay CRL, make contact of relay 1TF and winding of relay 2TF to (−). The operation of relay 2TF closes a locking circuit for itself extending from (+) on conductor TCSTK, make contact and winding of relay 2TF to (−). The operation of 2TF opens up and releases relay CRL for effecting the release of counting relay C1 and when relay CRL is released, relay CX is again operated as above described to prepare the counting relays for receiving the next or units digit.

When the units digit is dialed, the single impulse transmitted is effective to operate relays C1 and CHO, after which relays CX and CHO are released as previously described. The release of relay CHO closes the executing circuit for the units digit for operating units connecting relays UC1-6 and UCLO. The circuit for operating these relays may be traced from (+), make contact of relay SAP, conductor 27, break contact of relay CHO, make contacts in series of relays 1TF and 2TF, break contact of the number three transfer relay 3TF, odd units executing conductor XOU, make contact of relay C1, conductor UC1-6 and winding of relay UC1-6 to (−). The circuit for operating relay UCLO may be traced from a branch leading from the make contact of relay 2TF by way of conductor 61, make contact of relay 1TF, break contact of relay 3TF, conductor 49, make contact of relay C1, conductor UCLO and winding of relay UCLO to (−). These UC relays close locking circuits for themselves extending from (+) on stick conductor STK, make contacts and windings of the operated UC relays to (−). It will be obvious from the above example how other counting relays are operated when other units digits are dialed, with the particular high or low numbered line being selected by the UCLO and UCHI relays. For example, if the units digit is number 6, the same executing circuit is completed for operating relay UC1-6, but in this instance since counting relay C6 is operated, this executing circuit is extended by way of conductor 48 and make contact of relay C6 to conductor UCHI and relay UCHI for operating this latter relay. It will be clear from an examination of the contacts of these UC relays, how the line circuits are carried through a number of UC relays, with the particular individual line circuit being selected by the UCLO or UCHI relay which is operated in combination with the numbered UC relay.

With the UC relays operated, a circuit is again closed for operating relay CRL extending from (+) on conductor STK, make contacts of the operated UC relays, conductor UCSTK, make contack of relay 2TF, break contact of relay 3TF and upper winding of relay CRL to (−). The operation of relay CRL extends conductor UCSTK by way make contacts of relays 2TF and CRL to the winding of relay 3TF, for operating this relay, which closes a locking circuit for itself over the above described circuit by way of the make before break contact of relay 3TF. The operation of relay 3TF opens up and releases relay CRL. The operation of relay CRL opens conductor stick 1 for releasing relay C1 and when relay CRL is released, (+) is again applied to conductor stick 1 for operating relay CX to prepare the counting relay circuit for the next or stations digits.

When the UC relays are operated and before relay 3TF is operated, the called line circuit is tested to determine if it is idle or busy. It will first be assumed that the called line is idle, as indicated by the absence of (+) potential on the sleeve conductor of this line. Consequently, busy relay BY (Fig. 1B) is not operated and when relay 3TF operates, a circuit is closed for operating the cut off relay of the called line and for making this line busy, this circuit extending from (+), make contact of relay SAP, conductor 53, make contact of relay 1TF, break contact of busy relay BY, make contact of relay 3TF, conductor 1S, make contact of relay UCLO, make contact of relay UC1-6 and make contact of relay TC21 to the sleeve conductor S216 leading to the called line circuit.

When the stations digit is dialed, the single impulse transmitted is effective to release relays CB, P1 and P2 for operating relays C1 and CHO for thereafter releasing relays CX and CHO in the previously described manner. A circuit is now closed for operating ringing relay RI, Fig. 1B, extending from (+), make contact of relay SAP, conductor 27, make contact of relay CHO, make contact of relay 3TF, winding of relay RI and resistance 5R to (−). Relay RI closes a locking circuit for itself extending from (+) on stick conductor STK, make contact and winding of relay RI to (−) through resistor 5R. It will be noted that the operation of relay CHO closes, at its lower make contact, a shunt circuit across the back contact of relay RI. This shunt is to maintain the circuit to relay CHO completed when the RI relay is operated at the beginning of this series of impulses and when relay CHO is released at the end of the series of impulses, this bridge circuit is opened to prevent the operation of any other counting relay or the CHO relay in the event that the dial is again turned after the station digit is transmitted.

A circuit is closed for operating cut in relay CI extending from (+), make contact of relay SAP, conductor 27, break contact of relay CHO, make contacts in series of relays 1TF, 2TF and 3TF, make contact of relay RI, break contact of relay BY and lower winding of relay CI to (−). Relay CI closes a locking circuit for itself over the above described circuit which includes a make contact of relay CI shunting the make contact of relay RI for maintaining relay CI operated after relay RI is released when the called party answers; and relay RV is operated when the stations digits are 1 to 5, inclusive, over a circuit extending from (+) on conductor stick 1, break contacts of counting relays C0 to C6, inclusive, conductor 47, make contact of relay CI and winding relay RV to (−). In the event that the station digit is 6 or more, this circuit for relay RV is opened and ringing current is applied over the other side of the called line to ground. The ringing circuit is now closed for ringing the called station, this circuit extending from the 30 cycle frequency source (Fig. 2), make contact of relay C1, conductor 46, make contact of relay CI, winding of trip relay TR, make contact of reversing relay RV, make contact of relay RI, make contact of relay CI, conductor 1R, make contact of relay UCLO, make contact of relay UC1-6, make contact of relay TC21 and thence by way of the ring line R211 to the called station (not shown), back over line conductor T211, make contact of relay TC21, make contact of relay UC1-6, make contact of relay UCLO, conductor 1T, make contact of relay CI, make contact of relay RI, and make contact of relay RV to the other side of the generator which is grounded. It will be obvious how other sources of ringing frequencies are selected for application to the called line when other counting relays are left operated in response to the dialing of the stations digit. Furthermore, it will be seen that the operation of relay RV reverses the lines to which the ringing source and the grounded return leads are connected, thus providing for selective and divided circuit ringing.

When the call is answered, the closed circuit across the called line is effective to operate relay TR which in turn short circuits and releases relay RI and this latter relay in turn opens up and releases relay TR. The release of relay RI extends the called line circuit by way of make contacts of relay CI and break contacts or relay RI to the windings of answering bridge relay AB for feeding battery to the called station and for operating the AB relay. The operation of relay AB closes an obvious circuit for operating its repeater relay ABP, the function of which will be later described. Relay AB also reverses the battery to the calling line for supervisory and metering purposes. During the time that the called station is being rung, reverting ringing tone is applied to the calling station over a circuit extending from the reverting ringing tone source (Fig. 1B, lower right hand corner) through the tone condenser, make contact of relay CI, make contact of relay RI, conductor 43, break contact of relay BVP, condenser C3 and over the calling line circuit. The release of relay RI when the call is answered disconnects this tone from the calling line circuit.

When the conversation is completed and the called party hangs up, relays AB and ABP are released, with relay AB straightening out the battery feed to the calling station for supervisory and metering purposes. When the calling station hangs up, relays CB, P1 and P2 are released for effecting the slow release of relays SA and SAP. The release of relay SAP disconnects (+) potential from the circuits holding the various relays operated, thus effecting the release of relays C1, ON, LOC, LOCP, 1TF, 2TF, 3TF, cut off relay of the called line, CI, RC, HC2, TC21, and the UC relays.

It will now be explained how the circuits function when the called line is busy. When the UC relays are operated as above described and with the sleeve conductor of the called line connected to (+) as an indication that this line is busy, this (+) is extended by way of make contacts of the TC and UC relays, as previously described, conductor 1S, break contact of relay 3TF (but before this relay is operated), make contact of relay 2TF and lower winding of relay BY to (—). Relay BY operates and closes a locking circuit for itself extending from (+), make contact of relay SAP, conductor 53, make contact of relay 1TF, make contact of relay BY, resistor 6R and lower winding of relay BY to (—). Now when the stations digit is dialed, relay RI is operated as before, but relay CI is not operated because its lower winding is open at a break contact of relay BY. In this case the tip, ring and sleeve conductors of the called line are not interfered with and of course, relays TR, AB and ABP are not operated as in the previous example. The busy tone is applied to the calling line over a circuit extending from the busy tone source, break contact of relay BVP, conductor 38, make contact of relay BY, make contact of relay RI, conductor 37, make contact of relay ON, condenser C1 and condenser C3 to the calling line circuit. When the calling party hangs up, the various relays are released as before and since the release of relay SAP disconnects (+) from conductor 53, relay BY is released and the circuits are restored to normal.

The operation of relay BY closes a circuit for operating relay RBT extending from (+), break contact of relay TM, conductor 11, make contact of relay SAP, conductor AL, make contact of relay CRL, make contact of relay 2TF, make contact of relay BY and winding of RBT to (—). This circuit is maintained closed as long as relay CRL is operated and since this latter relay is released shortly after the operation of relay BY, the circuit to relay RBT is opened up for releasing the latter relay. Relay RBT performs no function in connection with a call of this class but is effective only in connection with reverting calls as will be later explained. It will be noted that the operation of relay RBT disconnects (+) on conductor AL from both windings of relay RC. However, this latter relay is maintained energized during the operation of relay RBT, the operating circuit extending from (+) on conductor AL, upper winding of relay RC, make contact of the make before break combination of relay RC, conductor 15, make contact of relay SA, sleeve conductor LS and sleeve conductor of the calling line and winding of the cut off relay (not shown) of the caling line to (—). When relay RBT is released, (+) on conductor AL energizes relay RC by way of its lower winding and this (+) is extended back to the calling sleeve conductor, thus maintaining relay RC operated throughout a regular call.

In connection with a call to a busy line, relay RI is not released until relay SAP is released for disconnecting (+) from conductor STK. This is because relay TR is not operated for short circuiting and releasing relay RI.

It will now be explained how the circuit functions in connection with a reverting call. When a calling party desires a connection with another station on the same line, the line number of the called party is the same as that of the calling party. Consequently all the digits of the called party's number will be the same as those of the calling party except the last or stations digit. In a call of this type, the circuit functions in exactly the same manner as described in connection with a call to a busy line up to the point where relays BY and RBT were operated as previously described. Relay RBT opens up both windings of relay RC, but relay RC is not maintained energized in this instance because the calling sleeve terminal is the same as the called sleeve terminal, thereby short circuiting the upper winding of relay RC and releasing this relay instead of maintaining it energized by way of its upper winding, as was described in the previous example. (+) potential is applied to the left hand terminal of the upper winding of relay RC over a circuit extending from (+), break contact of relay TM, conductor 11, make contact of relay SAP, and conductor AL to this terminal. With relay RBT operated, the right hand terminal of the upper winding of relay RC is disconnected from conductor AL, and this terminal is extended by way of conductor 15, back to the sleeve conductor S of the calling line and since this conductor is that of the called line, it is extended by way of make contacts of the operated TC and UC relays to conductor 1S and thence by way of the make contact of relay RBT, conductor AL, make contact of relay SAP, conductor 11, and break contact of relay TM to (+). This is effective to short circuit the upper winding of relay RC for releasing this relay and closing a circuit for locking relay RBT in its operated position. When relay 3TF is operated, this circuit extends from (+) on conductor AL, make contact of relay 3TF, break contact of relay RC, make contact and winding of relay RBT to (−). This locking of the RBT relay maintains both windings of the RC relay disconnected from conductor AL, thus preventing the operation of relay RC during the remaining portion of this particular call. It will thus be seen that relays BY and RBT will be operated and relay RC will be released when the units digit is dialed in connection with a reverting call.

When the stations digit is dialed, relay RI is operated over the previously described circuit and since relay BY is locked operated, the calling party will hear the busy tone over the previously described circuit. The instructions are for the calling party to hang up the receiver and wait a few seconds for ringing to be executed and then to remove the receiver to establish connection with the called party.

When the calling party hangs up, relays CB, P1 and P2 are released for effecting the slow release of relay SA, but relay SAP is not released in this example, since it is maintained energized over a circuit extending from (+) on conductor AL, make contact of relay RBT, upper winding of relay CI, conductor 14, break contact of relay CX, conductor 13, break contact of relay ABP, break contact of relay SA and winding of relay SAP to (−). This circuit operates relay CI and holds relay SAP. Relay CI opens up the pickup circuit to the counting and CHO relays to prevent any further operation of these relays when the CB, P1 and P2 relays are released.

The ringing circuit is now closed by way of the lower-most make contact of the counting relay left operated in response to the stations digit, conductor 45 or 46, make contact of relay CI, winding of relay TR, over the previously described line circuit to the called line terminals and back to the common generator ground. This rings the called station and when either the calling or called party removes the receiver, relay TR is operated for short circuiting and releasing relay RI, after which relay AB is operated over the line circuit for in turn operating relay ABP. The operation of relay ABP opens up and releases relay SAP, while at the continuity make contact of relay ABP, (−) through resistor 7R is extended back over conductor 13 for maintaining relay CI energized until relay SAP has time to release.

The release of relay SA, when the calling party hangs up, effects the release of the line finder by opening up sleeve conductor LS. The release of relay SAP removes (+) from the holding circuits of the various relays which were maintained operated, for effecting the restoration of these relays to normal. The removal of (+) from the calling line sleeve conductor effects the release of the lockout and cut off relays of this line. The cut off relay is slow to release and when the lockout relay is released, the closed circuit across the line conductor is effective to again operate the line relay for closing a hold circuit for the cut off relay. The line circuit is not shown but may be the same as that in the above mentioned Powell application, Serial number 770,119, filed August 22, 1947 and assigned to the same assignee as this application. Battery feed for a reverting call connection is fed through the windings of the line relay, this relay being operated for maintaining the line busy in the connector bank terminals and, with the cut off relay operated, the connections to the common start and the marker wires are maintained open. When both parties hang up their receivers, the line relay is released and the line circuit is restored to normal.

It will now be explained how the circuits function in connection with an incoming toll call to the suboffice. It will be assumed that the interoffice toll trunks terminate on line circuits in the suboffice, these line circuits being similar to local lines, the exception being that the toll line circuits have (+) connected to conductor TL for identifying calls originated on these lines as toll calls. When the closed circuit is applied across the incoming toll line, the line circuit functions to cause the line finder to extend this line circuit to the connector link for operating the CB, P1 and P2 relays in the previously described manner. In this instance however, (+) on conductor TL operates relay TL of the connector link. Now when relay SAP is operated a circuit is closed for immediately operating relay LOC, followed by the operation of relay LOCP, before waiting for the first digit to be dialed, as in the previous example. It will be understood that the first digit of the called telephone station has already been dialed in the distant office for selecting the toll trunk leading to the sub-office.

The circuit for operating relay LOC may be traced from (+), make contact of relay SAP, break contact of relay MO, conductor STK, make contact of relay TL, conductor 29 and upper winding of relay LOC to (−). Relay LOC closes a looking circuit for itself extending from (+), make contact of relay SAP, make contact and upper winding of relay LOC to (−). Relay LOC closes an obvious circuit for operating relay LOCP. The RC relay is operated as before but performs no function. Relay MO is not operated because relay LOCP is operated for opening up conductor 33 leading to conductor UCSTK before this later conductor is connected to (+) by the operation of the units connecting relays. Relay HCT is not operated in this class of call because the HCT conductor and conductor 32 are disconnected from conductor STK by the operation of relay TL before relay SAP operates to apply (+) to conductor STK. Furthermore, the UC relays are not operated when the connector link is seized, as in the previous example, because the trunk marker and the trunk allotter are not operated, conductor 51 being open at a make contact of relay HCT. This open condition of conductor 51 prevents the operation of the LO relays of the trunk marker and since these relays are not operated in connection with this call, the trunk allotter relays are not energized.

Since the office digit has already been dialed, the calling station will now transmit the hundreds, tens, units and stations digits for operating the connector circuit in the previously described manner, with the following exceptions. Since relay TL has been operated on this class of call, a shunt has been removed from the windings of relay BV for operating this relay to provide the busy verification feature when the toll operator finds the called line busy. When the toll operator dials the units digit and the UC relays have been operated, relays BY and RBT will be operated, as in the previous example. Relay RBT performs no function in a call of this class but relay BY applies busy tone to the calling station before the stations digit is dialed by way of the previously described circuit which now extends through a make contact of relay TL in shunt of the make contact of relay RI, the latter relay not operated at this time. Upon hearing the busy tone, the operator releases the connection for clearing out the circuits, after which she again seizes this connector link (or another similar link if this one is now busy) for again operating the CB, P1, P2, TL, LOC and LOCP relays. She now prefixes digit 1 to the wanted number which leaves counting relay C1 operated when relay CHO is released. A circuit is now closed for operating relays BV and CRL extending from (+), make contact of relay SAP, conductor 27, break contact of relay CHO, break contact of relay 1TF, conductor XOH, make contact of relay C1, conductor 28, make contact of relay LOC, winding of relay BV, conductor 35 and lower winding of relay CRL to (−). The operation of relay CRL effects the release of counting relay C1, after which the above described circuit is opened for releasing relays BV and CRL, the release of relay CRL again energizing relay CX to prepare the counting relay circuit for the hundreds digit. The operation of relay BV closes an operating circuit for relay BVP extending from (+), make contact of relay BV and winding of relay BVP to (−), relay BVP closing a locking circuit for itself extending from (+), make contact of relay SAP, make contact and winding of relay BVP to (−). The operation of relay BVP opens up the busy tone circuit so that the operator and the stations on the busy talking connection will not hear this tone when the operator cuts in on the busy circuit to offer the call. The cut in circuit may be traced from the calling line connected to the windings of relay CB, condensers C2 and C3, make contacts of relay BVP, conductors 62 and 42, make contacts of relay BY and thence over conductors 1T and 1R to the called line. It will be noted that this cut in circuit by-passes the contacts of the RI and CI relays so that the operator can instruct the parties on the busy connection to hang up for clearing out the connection for the toll call. Now the operator again releases the connection, seizes the connector link and dials the desired number without the prefix, it being assumed that the called line is now idle. Consequently, the circuit functions in the previously described manner and since relay BY is not operated, the BV and BVP relays are not operated. It will be noted that relay TL disconnects (−), through resistor 3R, from the windings of relay TM after the second digit has been dialed, as marked by the operation of relay 2TF. This is to cancel the timing function on toll calls after the dialing of the tens digit.

It will now be explained how the circuits function when a local station in the suboffice removes the receiver and dials a number associated with a distant office station. In this example, the first digit will be any number except 7, 8 or 9. This marks the call as being one to be completed in the distant office because the counting relays do not stop at a point to extend the executing circuits for the first digit to conductor 31 for operating relay LOC, as in the previous example. Consequently, relays LOC and LOCP are not operated in connection with a call of this type. When the dial impulses for the first digit are terminated, some counting relay other than C7, C8 or C9 is left operated and when relay CHO is released, a circuit is closed for operating link cut off relay LCO, this circuit extending from (+), make contact of relay SAP, conductor 27, break contact of relay CHO, break contact of relay 1TF, odd or even executing conductor XOH or XEH, make contact of the counting relay left operated, conductor 24, break contact of relay BY, conductor 25 and lower winding of relay LCO to (−). Relay LCO operates to switch the line circuit from the connector link to the trunk repeater. This is because the call is marked as being one to be completed in the distant office, thus making it unnecessary to continue the operation of the impulse receiving, recording and executing circuits in the equipment in the suboffice. If #2 is the first digit, then the circuit to conductor 24 is by way of conductor 2H and break contact of relay LOCP.

Relay LCO switches the line conductors LT and LR, associated with the calling line, from the windings of the CB relay of the connector link to conductors 1T and 1R and thence through make contacts of the UC and HCT relays to the particular interoffice trunk selected, this selection being effected in the previously described manner. The closed circuit across the calling line operates relay TCB of the trunk repeater for applying (+) to conductor AL for making this trunk busy and for applying (+) to conductor S1, this circuit being extended back by way of conductor 1S, make contacts and upper winding of relay LCO for locking this relay in its operated position. This same conductor 1S is extended back to the sleeve of the calling line for holding the cut off and lockout relays when relay SA of the connector link is released. Relays CB, P1, P2, SA and SAP are released when relay LCO is operated, relay CB being opened at the continuity contacts of relay LCO and the circuit from (+) for operating relays P1, P2 and SA being opened at the uppermost break contact of relay LCO. Relay SA releases relay SAP. Relay LCO applies (+) to conductors AL and STK to replace the (+) applied to these conductors through make contacts of the SA and SAP relays, for making this link busy and for holding the line finder relays after the operation of relay LCO. Relay LCO applied (+) to conductor 27 before relay SAP disconnects its (+) from this conductor, thus maintaining relay ON locked operated. Since relay SAP disconnects (+) from conductor 18, the circuits for holding the counting relay which was left operated and for holding the various other relays of the link operated are de-energized. Relay ON is maintained locked for opening up and releasing relay MO, this latter relay being operated when the inter-office trunk was first seized. In this connection, it will be obvious that the first digit is repeated to the inter-office trunk by the intermittent operation of the lower make contact of relay CB over the previously described circuit including the lowermost make contact of relay MO. Since this first digit marks the call as one to be continued on the trunk circuit, the operation of relay LCO extends the calling line through the trunk repeater, by-passing the contacts of the CB and MO relays. Thus the remaining digits are transmitted directly to relay TCB of the trunk repeater and this relay in turn repeats these digits to the inter-office trunk. It is obvious that the HCT and UC relays of the line and trunk connector must be maintained operated during the remaining portion of this call to extend the 1T and 1R conductors through to the trunk repeater. This is done by maintaining (+) potential on stick conductor STK by way of lowermost make contact of relay LCO, break contacts in multiple of relays MO and LOC and conductor STK to the locking circuits of the HCT and UC relays.

It will now be explained how the circuits function under both of the above conditions when the call is initiated and all inter-office trunks are busy, the first condition being when the call is to be terminated in the originating suboffice and the second condition being when the call is to be terminated in a distant office. Under the first condition, it will be obvious that the circuits in the suboffice will function to complete the call, even though all inter-office trunks are busy, because the first digit is canceled and the remaining digits operate the circuits for selecting the station of the called line in the originating office, all in the manner previously described. In this class of call however, the trunk marker relays are operated for extending (+) to the trunk allotter, but since all trunks are busy, all AL relays will be operated thus extending this (+) through make contacts of all AL relays in series and back through the operated marker relay (LO1, etc.) and conductor BY to the upper winding of relay BY for operating this relay. Relay BY locks over a portion of the previously described circuit but which now includes a break contact of relay LOC and conductor 41. The busy tone is not applied to the calling line because it is open at make contacts of relays TL and RI, both of these relays being normal at this time. It will be seen that relay BY extends conductor 16 by way of a break contact of relay TL and a break contact of relay RI to the pickup conductor so that the impulses of the succeeding digits will be effective to operate the counting relays and the change-over relay. Furthermore, the opening of the uppermost break contact of relay BY disconnects conductor 34 from conductor 52 for releasing the operated relays of the trunk marker. In this example, relay HCT is operated but the UC relays are not operated because no ALG relay is operated in response to this call when all trunks are busy. When relay LOC operates in response to the first (local) digit, conductor 41 will be de-energized and, since relay 1TF does not operate until the next or hundreds digit is dialed, the locking circuit for relay BY is de-energized, this relay releases and remains released in readiness for the test of the called local line.

In the second type of call, that is where all inter-office trunks are busy and the call is intended for a distant office station, relay BY is operated in the same manner as explained in connection with the first type of call. In this instance however, relays LOC and LOCP are not operated and of course relay 1TF is not operated on an inter-office call, consequently the locking circuit for relay BY is maintained complete through a break contact of relay LOC and conductor 41 until the calling party releases the connection. Since no UC relay is operated, the MO relay is not operated and the conductors 1T and 1R are not extended to any trunk circuit so that the following impulses repeated by the lower make contact of relay CB are not effective. Since the following impulses are effective to intermittently apply (+) potential to conductor 17, these impulses extend through a break contact of relay CI and break contact of relay RI to the pickup conductor. Furthermore, conductors stick 1 and stick 2 are energized in the previously described manner so that the counting relays will be operated in response to the first digit and when execution for this first digit is effected by the release of relay CHO, (+) potential is extended through the counting relay left operated to conductor 24 (since this first digit is not 7, 8 or 9) and thence through a make contact of busy relay BY to the winding of relay RI for operating this latter relay. This operation of the counting relays is of no consequence, since relay CI cannot be operated because its operating circuit is open at a break contact of relay BY. The calling party now receives busy tone over a circuit extending from the busy tone source, break contact of relay BVP, conductor 38, make contact of relay BY, make contact of relay RI, conductor 37, make contact of relay CN, condenser C1 and over the previously described circuit to the calling line.

It will now be explained how the time release feature of the circuits functions. The common conductors for providing the time release feature extend from the left-hand portion of the connector link of Fig. 1-A and connect to common timing apparatus, such for example as shown in Fig. 8 of Powell Patent 2,325,877, issued August 3, 1943. When the connector link is first seized and relay SAP operates to apply (+) potential to common start conductor ST, the timing apparatus is started into operation by the operation of a relay corresponding to relay STR of the above patent. During the operation of the common timing apparatus, pulses are applied to pickup conductor PU2 and holding conductor H2 (for controlling the permanent signal type of time release) in the manner that pulses are applied to corresponding conductors 204 and 203 in the above patent. These pulses are applied at comparatively short intervals to control the release of the apparatus in a comparatively short time if conversational circuits are not completed within this time.

In the event that the calling party does not start or complete the dialing operation, or in the event of a permanent signal, or in the event that the call is not answered within the time release interval, a circuit is closed for operating relay TM, extending from the momentary (+) potential applied to conductor PU2, break contact of relay ABP, conductor 22, break contact of relay TM, conductor 21, make contact of relay SAP, break contact of relay ABP, conductor 30, lower winding of relay TM, break contact of relay TL and resistor 8R to (−). At the time that this momentary (+) is applied to conductor PU2, conductor H2 is connected to (+), this latter conductor being maintained connected to (+) during the time release interval. Relay TM closes a locking circuit for itself extending from (+), make contact of relay TM, conductor 21 and over the previously described circuit including its lower winding. Relay TM switches conductor 11 from direct (+) to conductor 19, which is connected to common conductor H2 by way of a break contact of relay ABP. Consequently, the holding circuit for the line finder, including conductors 11 and STK of the line finder, now includes conductor H2. In the event that relay ABP is not operated during this time release interval, when (+) potential is removed from conductor H2, the above described holding circuit for the line finder is deenergized. The line finder is released for effecting the release of the lockout relay of the calling line (not shown but which may be the same line circuit shown in Fig. 2 of the above patent) for energizing the line relay of the line circuit over the line, which holds the cut off relay operated and prevents the operation of the lockout relay, thus holding the calling line in a locked out condition. Since the closed circuit of the calling line is disconnected from the CB relay of the connector link, the connector link is restored to normal.

In connection with the conversation time release feature, relay ABP will be operated because relay AB is operated over the called line circuit. The common timer is started operating as previously described, the pickup conductor PU5 is substituted for conductor PU2 and holding conductor H5 is substituted for conductor H2. Consequently, relay TM may be operated over the previously described circuit up to the contact of relay ABP, being now extended through this make contact and conductor 20 to the upper winding of relay TM. Relay TM operates, locks and substitutes conductor H5 for the described (+) connection to conductor 11. Since the (+) potential is maintained on conductor H5 for a longer time interval than on conductor H2 (for example five minutes), the connection will not be released in such a short interval as the previously described connection. However, shortly before the (+) potential is removed from conductor H5 a disconnect tone is connected to the established connection over a circuit extending from the source of disconnect tone, make contact of relay AB, conductor 39, make contact of relay TM, conductor 37, make contact of relay ON, condenser C1 and condenser C3 to the line circuit. After this momentary pulse of disconnect tone is terminated, a short interval elapses before (+) is removed from conductor H5 and when this potential is removed from conductor H5, conductor 11 is de-energized for releasing the circuit in the previously described manner.

The winding of relay TM is differentially connected for the reason now to be explained. In the event that relay TM is first operated from the pulse on conductor PU2 by way of its lower winding of this relay, it is also locked by way of this lower winding. Now when the call is answered relay TM must be released to start the conversation time release period at the beginning of the cycle. When the call is answered, relay ABP operates and relay TM is released by energizing its upper winding in opposition to the direction of energization of its lower winding over a circuit extending from (+), make contact of relay TM, conductor 21, make contact of relay SAP, make contact of relay ABP, conductor 20, upper winding of relay TM and over the previously described circuit to (—). This arrangement kicks relay TM down when it is in its operated position at the time relay ABP operates. It will be seen that, when the locking circuit of relay TM is to be maintained effective, this circuit is always completed through the same winding through which the relay was energized and when relay TM is to be kicked down the releasing circuit is through the opposite winding from that over which the relay was operated.

Having described an automatic telephone system as particularly adapted for use in an interoffice network in which one office is a sub-office of the all-relay type, operating in connection with a distant main office as one specific embodiment of the invention and since this embodiment discloses certain new and novel features as particularly applied to an all-relay type system, it is desired to be understood that the present form is selected to facilitate the disclosure of the invention rather than to limit the number of forms which it may assume and it is to be further understood that various modifications, adaptations and alterations may be applied to the specific form shown in order to meet the requirements of practice without in any manner reparting from the spirit or scope of the present invention except as limited by the appended claims.

What I claim is:

1. In an automatic telephone system, a main office and a suboffice, a plurality of interoffice trunks interconnecting said offices, subscribers' lines in said suboffice, a plurality of connector links in said suboffice, a main office marking relay and a local suboffice marking relay associated with each of said links, means controlled in response to a call originated on a first one of said subscribers' lines for selecting one of said links and one of said trunks, means responsive to the selection of said one link for operating said main office marking relay, means responsive to the transmission of impulse digits over said first line for selecting a second line in said suboffice, means including the operated main office marking relay responsive to the reception of one of said digits for repeating said one digit over said selected trunk, means responsive only to the reception of a particular first digit for operating said local suboffice marking relay and for releasing said main office marking relay, means responsive to the release of said main office marking relay for freeing said selected trunk, and means responsive to the operation of said local suboffice marking relay for rendering said one link effective to complete a connection to said second line, and means associated with said one link for signaling said second line.

2. In an automatic telephone system, a main office and a suboffice, a plurality of interoffice trunks interconnecting said offices, subscribers' lines in said suboffice, a plurality of connector links in said suboffice, a plurality of line and trunk connecting relays associated with each of said links, means responsive to calls originating on calling lines in said suboffice for selecting said links, means responsive to the selection of said links for operating the associated trunk connecting relays in various combinations for selecting said trunks, impulse receiving means responsive to the transmission of series of impulse digits over calling lines connected to said links for operating the associated line connecting relays in various combinations for selecting called lines in said suboffice, and means responsive to a particular value of the first digit of a series for causing the associated originating call to be completed by way of said trunk connecting relays, and means responsive to another particular value of said first digit for releasing said trunk connecting relays and for causing said call to be completed by way of said line connecting relays.

3. In an automatic telephone system, a main office and a suboffice, a plurality of interoffice trunks interconnecting said offices, subscribers' lines in said suboffice, a plurality of connector links in said suboffice, a plurality of line and trunk connecting relays associated with each of said links, means responsive to calls originating on calling lines in said suboffice for selecting said links, means responsive to the selection of said links for operating the associated trunk connecting relays in various combinations for selecting said trunks, impulse receiving means responsive to the transmission of a series of impulse digits over calling lines connected to said links for operating the associated line connecting relays in various combinations for selecting called lines in said suboffice, and means selectively responsive to the number of impulses in the first digit of a series for causing the associated originating call to be completed by way of said trunk connecting relays or for releasing said trunk connecting relay and for causing said call to be completed by way of said line connecting relays depending upon the number of impulses in said first digit.

4. In an automatic telephone system, a main office and a suboffice, a plurality of interoffice trunks interconnecting said offices, subscribers' lines in said suboffice, a plurality of connector links in said suboffice, means controlled in response to a call originating on a first one of said subscribers' lines for selecting one of said links and one of said trunks, impulse repeating means responsive to the transmission of impulse digits over said first line for selecting a second line in said suboffice, means responsive to the reception of the first one of said digits for repeating said one digit over said selected trunk, a main office marking relay and a local office marking relay associated with each link, means responsive to said selection of said one link for operating said main office marking relay, means responsive only to the reception of a particular first digit for operating said local office marking relay, means responsive to the operation of said local office marking relay for releasing said main office marking relay whereby said selected trunk is cleared out and whereby said one link is rendered effective to complete a connection to said second line, and means associated with said one link for signaling said second line.

5. In an automatic telephone system; a main office and a suboffice; a plurality of interoffice trunks interconnecting said offices; subscribers' lines in said suboffice; a plurality of connector links in said suboffice; means controlled in response to a call originating on a first one of said subscribers' lines for selecting one of said links and making a connection to one of said trunks; impulse repeating means responsive to the transmission of impulse digits over said first line for selecting a second line in said suboffice; means responsive to the reception of the first one of said digits for repeating said one digit over said selected trunk; a main office marking relay and a local office marking relay associated with each link; means responsive to said selection of said one link for operating said main office marking relay; means responsive to the reception of a particular first digit for operating said local office marking relay; means responsive to the operation of said local office marking relay for releasing said main office marking relay whereby said selected trunk is cleared out and whereby said one link is rendered effective to complete a connection to said second line, means for preventing reoperation of said main office marking relay during said connection, and means associated with said one link for signaling said second line.

6. In an automatic telephone system; a suboffice and a main office; a plurality of interoffice trunks interconnecting said offices; a switching connector repeater in said suboffice; means including said switching connector repeater for extending each call originating in said suboffice to one of said trunks and adapted to complete said originating calls by way of said trunks or to release said originating calls from said trunks and thereafter to complete the connection to a local line in said suboffice; means operative according to the value of the first digit dialed into said switching connector repeater for determining whether the said completing means is made effective to complete the call locally or by way of one of said trunks; and means including said switching connector repeater for signalling a called line.

7. In an automatic telephone system; a suboffice and a main office; a plurality of interoffice trunks interconnecting said offices; a switching connector repeater in said suboffice; means including said switching connector repeater for extending each call originating in said suboffice to one of said trunks, first means effective to complete said originating calls by way of said one of said trunks, second means effective to release said originating calls from said one of said trunks and thereafter complete the connection to a local line in said suboffice; means controlled in accordance with the value of one of the digits dialed into said switching connector repeater for determining whether said first or said second means is employed to complete the call; and means including said switching connector repeater for ringing said local line.

8. In an automatic telephone system including a main office and a suboffice; a plurality of interoffice trunks interconnecting said offices; means including a switching device in the suboffice for extending a calling suboffice line to the main office by way of one of said trunks in response to the initiation of a call; means including said device responsive to the dialing of a series of digits for completing calls locally or by way of one of said trunks depending on the value of one of the series of digits; means associated with said device for applying busy tone to the calling subscriber's line on a call to be completed by way of one of said trunks when all of said trunks are busy; and means associated with said device for preventing the application of busy tone to the calling subscriber's line on a call to be completed locally when all of said trunks are busy.

9. In an automatic telephone system including a main office and a suboffice; a plurality of interoffice trunks interconnecting said offices; means including a switching device in the suboffice for extending a calling suboffice line to the main office by way of one of said trunks in response to the initiation of a call; means including said device responsive to the dialing of series of digits for completing calls locally or by way of one of said trunks depending on the value of one of the series of digits; means associated with said device for applying busy tone to the calling subscriber's line on a call to be completed by way of one of said trunks when all of said trunks are busy; and means associated with said device for preventing the application of busy tone to the calling subscriber's line on a call to be completed locally when all of said trunks are busy, said last two means being selectively responsive to the first digit dialed.

10. In an automatic telephone system, a group of trunks, a group of local subscribers' lines, a dialing device associated with each trunk and each line, a connector having a trunk group selecting relay and a separate line group selecting relay, means for extending a call from either of said groups to said connector, means responsive to the seizure of said connector for operating said trunk group selecting relay, means responsive to the first digit when it has one particular value for releasing said operated trunk group relay, means responsive to the first digit when it has another particular value for holding operated said operated trunk group relay, and means responsive to succeeding digits for continuing the operation of said connector or not depending on the value of said first digit.

11. In an automatic system including a main office and a suboffice, a plurality of trunks interconnecting said offices, a plurality of subscribers' lines in said suboffice, a dialing device associated with each trunk and each line, said suboffice having a connector repeater comprising a group of combined trunk and line connecting relays through which connections between suboffice subscribers' lines may be completed to other suboffice lines or to said interoffice trunk lines, means responsive to an originating call from said suboffice lines before any dialing operation is effected for variably operating said relays for selecting interoffice trunk lines, means responsive to dial impulses received by said connector repeater during said call for releasing said operated relays, and means for re-operating said released relays in various combinations during said call for selecting said other suboffice lines.

ROY W. JONES.

REFERENCES CITED

The following references are of record in the file of this patent:

UNITED STATES PATENTS

| Number | Name | Date |
|---|---|---|
| Re. 22,813 | Kessler | Dec. 3, 1946 |
| Re. 23,056 | Voss | Dec. 7, 1948 |
| 1,644,727 | Jacobsen | Oct. 11, 1927 |
| 1,682,158 | Willis | Aug. 28, 1928 |
| 1,716,986 | Stehlik | June 11, 1929 |
| 1,746,327 | Von Beckerath | Feb. 11, 1930 |
| 1,747,405 | Von Beckerath | Feb. 18, 1930 |
| 1,891,423 | Kahn | Dec. 20, 1932 |
| 2,023,702 | Saunders | Dec. 10, 1935 |
| 2,416,131 | Voss | Feb. 18, 1947 |